United States Patent
Saito et al.

(10) Patent No.: US 9,017,753 B2
(45) Date of Patent: Apr. 28, 2015

(54) OIL OR FAT COMPOSITION CONTAINING DIGLYCERIDES

(75) Inventors: Katsuyoshi Saito, Wynnewood, PA (US); Masao Shimizu, Edogawa-ku (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 14/116,582

(22) PCT Filed: May 18, 2012

(86) PCT No.: PCT/JP2012/063413
§ 371 (c)(1),
(2), (4) Date: Nov. 8, 2013

(87) PCT Pub. No.: WO2012/161294
PCT Pub. Date: Nov. 29, 2012

(65) Prior Publication Data
US 2014/0113055 A1    Apr. 24, 2014

(30) Foreign Application Priority Data

May 20, 2011   (JP) ................................. 2011-113358
Feb. 15, 2012   (JP) ................................. 2012-030643

(51) Int. Cl.
*A23D 9/013*    (2006.01)
*C11C 3/02*    (2006.01)
*A23D 7/005*    (2006.01)

(52) U.S. Cl.
CPC ................ *A23D 7/005* (2013.01); *A23D 9/013* (2013.01); *C11C 3/02* (2013.01)

(58) Field of Classification Search
None
See application file for complete search history.

(56) References Cited

U.S. PATENT DOCUMENTS

| | | | | |
|---|---|---|---|---|
| 3,845,087 A | * | 10/1974 | de Groot | 554/165 |
| 4,154,749 A | * | 5/1979 | Krawack | 554/169 |
| 4,263,216 A | * | 4/1981 | Volpenhein | 554/164 |
| 6,004,611 A | | 12/1999 | Gotoh et al. | |
| 2002/0025370 A1 | | 2/2002 | Sugiura et al. | |
| 2003/0099754 A1 | | 5/2003 | Sakai et al. | |
| 2009/0202704 A1 | | 8/2009 | Osaki et al. | |
| 2010/0267681 A1 | | 10/2010 | Hosoya et al. | |
| 2011/0151102 A1 | | 6/2011 | Fujii et al. | |
| 2013/0184346 A1 | | 7/2013 | Saito et al. | |

FOREIGN PATENT DOCUMENTS

| | | | |
|---|---|---|---|
| CN | 1628546 A | | 6/2005 |
| CN | 101505609 A | | 8/2009 |
| CN | 101507721 A | | 8/2009 |
| EP | 1 297 752 | | 4/2003 |
| EP | 2 090 176 | | 8/2009 |
| JP | 4 300826 | | 10/1992 |
| JP | 10 176181 | | 6/1998 |
| JP | 2002 20782 | | 1/2002 |
| JP | 2007 68407 | | 3/2007 |
| JP | 2008 61577 | | 3/2008 |
| WO | WO2007097523 | * | 8/2007 |
| WO | 2010 030047 | | 3/2010 |

OTHER PUBLICATIONS

Siew, Wai Lin. 1995. J. Sci Food Agric 69:73.*
Nakamura, H., "The Role of Dietary Fats in Preventive Medicine", Oil Chemistry, vol. 40, No. 10, pp. 815-821, (1991) (with computer generated translation).
Written Opinion of the International Searching Authority Issued Sep. 4, 2012 in PCT/JP12/063413 Filed May 18, 2012.
International Search Report Issued Sep. 4, 2012 in PCT/JP12/063413 Filed May 18, 2012.

* cited by examiner

*Primary Examiner* — Carolyn Paden
(74) *Attorney, Agent, or Firm* — Oblon, McClelland, Maier & Neustadt, L.L.P.

(57) ABSTRACT

Provided is an oil or fat composition rich in diacylglycerol, including a high content of oleic acid in a constituent fatty acid thereof and having a good appearance at normal temperature. Specifically, the oil or fat composition satisfies the following items (1) to (4): (1) the oil or fat composition includes diacylglycerol in an amount of 20 mass % or more; (2) constituent fatty acids of the diacylglycerol include oleic acid in an amount of 30 mass % or more; (3) the mass ratio of the content of (B) 1,3-dipalmitin diacylglycerol to the content of (A) 1,2-dipalmitin diacylglycerol, [(B)/(A)], in the diacylglycerol is 1.45 or less; and (4) the mass ratio of the content of (D) 1,3-diacylglycerol to the content of (C) 1,2-diacylglycerol, [(D)/(C)], in the diacylglycerol is 1.2 or more.

20 Claims, No Drawings

OIL OR FAT COMPOSITION CONTAINING DIGLYCERIDES

FIELD OF THE INVENTION

The present invention relates to an oil or fat composition rich in diacylglycerol.

BACKGROUND OF THE INVENTION

It is known that an oil or fat containing diacylglycerol at a high concentration has physiological actions such as an action of inhibiting an increase in a postprandial blood triglyceride (neutral fat) level and a reduced bioaccumulation potential (see, for example, Patent Documents 1 and 2). On the other hand, there is a tendency that diacylglycerol easily crystallizes because diacylglycerol has higher melting point than triacylglycerol, and the precipitated crystals are hardly dissolved. Further, diacylglycerol is known to include 1,3-diacyl glycerol and 1,2-diacylglycerol which are generally in equilibrium at a ratio of 2:1.

A method of removing a high melting point portion in advance by wintering is known as a method of inhibiting the crystallization of an oil or fat. It is known that the content of a saturated fatty acid can be reduced by nearly 30 mass % by adding an emulsifier serving as a fractionation aid to an oil or fat containing diacylglycerol at a high concentration during wintering to achieve solid-liquid separation (Patent Document 3).

Further, oleic acid is considered to be a favorable fatty acid from the viewpoints of its taste and flavor and its heating stability (Patent Document 4) or the viewpoint of health benefits (Non Patent Document 1). Thus, an edible oil having a high content ratio of oleic acid has been demanded by consumers.

PRIOR ART DOCUMENT

Patent Document

[Patent Document 1] JP-A-4-300826
[Patent Document 2] JP-A-10-176181
[Patent Document 3] JP-A-2002-20782
[Patent Document 4] JP-A-2008-61577

Non Patent Document

[Non Patent Document 1] "Preventive medicine and the role of the oils and fats," Petrochemistry, Vol. 40, No. 10, p. 815-821

SUMMARY OF THE INVENTION

The present invention provides an oil or fat composition, satisfying the following items (1) to (4):

(1) the oil or fat composition includes diacylglycerol in an amount of 20 mass % or more;
(2) constituent fatty acids of the diacylglycerol include oleic acid in an amount of 30 mass % or more;
(3) the mass ratio of the content of (B) 1,3-dipalmitin diacylglycerol to the content of (A) 1,2-dipalmitin diacylglycerol, [(B)/(A)], in the diacylglycerol is 1.45 or less; and
(4) the mass ratio of the content of (D) 1,3-diacylglycerol to the content of (C) 1,2-diacylglycerol, [(D)/(C)], in the diacylglycerol is 1.2 or more.

DETAILED DESCRIPTION OF THE INVENTION

It has been found that a known technology cannot provide a sufficient effect of inhibiting the crystallization of a diacylglycerol-rich oil or fat in some cases. That is, it has been found that, when an oil or fat includes a high content of oleic acid in the constituent fatty acids of diacylglycerol, its crystals cannot maintain their fluidity, and hence it is difficult to achieve solid-liquid separation by filtration and centrifugal separation. Further, even when the solid-liquid separation is achieved, the resultant oil or fat is turbid at normal temperature in some cases.

In view of the circumstances mentioned above, the present invention provides an oil or fat composition rich in diacylglycerol, the oil or fat composition including a high content of oleic acid in constituent fatty acids thereof and having a good appearance at normal temperature.

The inventors of the present invention have made intensive studies to search for an oil or fat in which even if its crystals precipitate under low temperature, but the crystals are dissolved upon returning to normal temperature. As a result, the inventors have found that 1,3-diacylglycerol among disaturated diacylglycerol is difficult to be dissolved and causes turbidity. However, on the other hand, 1,3-diacylglycerol is preferably contained in a large amount from the viewpoint of exerting the physiological effects of diacylglycerol. Then, the inventors have further made studies and have consequently found that 1,3-dipalmitin diacylglycerol included in 1,3-diacylglycerol as a minor component is a seed crystal and the solubility of the crystals of an oil or fat at normal temperature significantly be improved by reducing only the content of 1,3-dipalmitin diacylglycerol. That is to say, the inventors have found that the solubility of the crystals of an oil or fat at normal temperature significantly be improved by reducing selectively the content of 1,3-dipalmitin diacylglycerol while maintaining the content of 1,3-diacylglycerol in the whole diacylglycerol, thereby controlling the content ratio of 1,3-dipalmitin diacylglycerol to 1,2-dipalmitin diacylglycerol to lower than the content ratio in equilibrium. Note that 1,2-dipalmitin diacylglycerol is also called 1,2-dipalmitoyl glycerol.

According to the present invention, it is possible to provide an oil or fat composition rich in diacylglycerol, the oil or fat composition including a high content of oleic acid in constituent fatty acids thereof, being excellent in physiological effects, and having a good appearance at normal temperature.

The oil or fat composition of the present invention contains diacylglycerol in an amount of 20 mass % (hereinafter, abbreviated to "%") or more, preferably 25% or more, more preferably 30% or more, even more preferably 40% or more, even more preferably 50% or more, even more preferably 80% or more, from the standpoint of the physiological effects. The oil or fat composition of the present invention contains diacylglycerol in an amount of preferably 98% or less, more preferably 95% or less, even more preferably 93% or less, even more preferably 92% or less, from the standpoint of the industrial productivity of an oil or fat. The oil or fat composition of the present invention contains diacylglycerol in an amount of preferably from 25 to 98%, more preferably from 30 to 95%, even more preferably from 50 to 93%, even more preferably from 80 to 92%, from both the standpoints of the physiological effects and the industrial productivity of an oil or fat. Note that the "oil or fat" in the present invention includes any one or more kinds of triacylglycerol, diacylglycerol, and monoacylglycerol.

In the present invention, the content of oleic acid in the constituent fatty acids of the diacylglycerol is 30% or more, preferably 35% or more, more preferably 40% or more, even more preferably 45% or more, even more preferably 50% or more, from the standpoint of effectively exerting the effects of the present invention, and thus being excellent in physiological effects. The content of oleic acid is preferably 95% or less, more preferably 93% or less, even more preferably 90% or less, from the standpoint of the industrial productivity of an oil or fat. The content of oleic acid is preferably from 30 to 95%, more preferably from 35 to 95%, even more preferably from 40 to 93%, even more preferably from 45 to 90%, even more preferably from 50 to 90%, from both the standpoints of effectively exerting the effects of the present invention, and thus being excellent in physiological effects and the industrial productivity of an oil or fat.

The content of an unsaturated fatty acid in the constituent fatty acids of the diacylglycerol is preferably from 80 to 100%, more preferably from 85 to 99%, even more preferably from 90 to 98%, from the standpoints of its appearance and the physiological effects. The unsaturated fatty acid has preferably 14 to 24 carbon atoms, more preferably 16 to 22 carbon atoms, from the standpoint of the physiological effects.

The content of a saturated fatty acid in the constituent fatty acids of the diacylglycerol is preferably 40% or less, more preferably 30% or less, even more preferably 25% or less, even more preferably 20% or less, from the standpoints of its appearance and physiological effects. Further, the content is preferably 2% or more, more preferably 3% or more, even more preferably 4% or more, even more preferably 5% or more even more preferably 5.5% or more from the standpoints of industrial productivity of the oil or fat. Further, the content is preferably from 0 to 30%, more preferably from 0 to 25%, even more preferably from 2 to 20%, even more preferably from 3 to 20%, even more preferably from 5 to 20%, even more preferably 5.5% to 20% from both of the standpoints of its appearance and the physiological effects and the industrial productivity of an oil or fat. The saturated fatty acid has preferably 14 to 24 carbon atoms, and more preferably 16 to 22 carbon atoms.

Further, the content of a trans-unsaturated fatty acid in the constituent fatty acids of the diacylglycerol is preferably from 0.01 to 5%, more preferably from 0.01 to 3.5%, even more preferably 0.01 to 3%, from the standpoints of exerting the physiological effects of the diacylglycerol and improving the appearance of the oil or fat composition.

In the oil or fat composition of the present invention, the mass ratio of the content of (B) 1,3-dipalmitin diacylglycerol to the content of (A) 1,2-dipalmitin diacylglycerol, [(B)/(A)], in the diacylglycerol is 1.45 or less, preferably 1.4 or less, more preferably 1.35 or less, even more preferably 1.3 or less, even more preferably 1.2 or less, even more preferably 1.15 or less, even more preferably 1.1 or less, even more preferably 1.0 or less, from the standpoint of high solubility at normal temperature of its crystals precipitated under low temperature. Note that the lower limit of the [(B)/(A)] is preferably 0.2, more preferably 0.4, even more preferably 0.5, from the standpoint of the industrial productivity of an oil or fat. The [(B)/(A)] is preferably from 0.2 to 1.45, more preferably from 0.2 to 1.4, even more preferably from 0.2 to 1.35, even more preferably from 0.2 to 1.3, even more preferably from 0.4 to 1.2, even more preferably from 0.4 to 1.15, even more preferably from 0.4 to 1.1, even more preferably from 0.4 to 1.0, even more preferably from 0.5 to 1.0, from both the standpoints of high solubility at normal temperature of its crystals precipitated under low temperature and of the industrial productivity.

Further, in the oil or fat composition of the present invention, the mass ratio of the content of (D) 1,3-diacylglycerol to the content of (C) 1,2-diacylglycerol, [(D)/(C)], in the diacylglycerol is 1.2 or more, preferably 1.3 or more, more preferably 1.4 or more, even more preferably 1.5 or more, even more preferably 1.6 or more, even more preferably 1.7 or more, even more preferably 1.8 or more, from the standpoint of effectively exerting the physiological effects of the diacylglycerol. Note that the upper limit of the [(D)/(C)] is preferably 3.0, more preferably 2.5, from the standpoint of the industrial productivity of an oil or fat. The [(D)/(C)] is preferably from 1.2 to 3.0, more preferably from 1.3 to 3.0, even more preferably from 1.4 to 3.0, even more preferably from 1.5 to 3.0, even more preferably from 1.6 to 2.5, even more preferably from 1.7 to 2.5, even more preferably from 1.8 to 2.5, from both of the standpoints of the physiological effects of the diacylglycerol and the industrial productivity of an oil or fat. The (C) 1,2-diacylglycerol includes 1,2-disaturated diacylglycerol, 1,2-monosaturated monounsaturated diacylglycerol, and/or 1,2-diunsaturated diacylglycerol, and the (D) 1,3-diacylglycerol includes 1,3-disaturated diacylglycerol, 1,3-monosaturated monounsaturated diacylglycerol, and/or 1,3-diunsaturated diacylglycerol.

In the oil or fat composition of the present invention, [[(B)/(A)]/[(D)/(C)]], which is the mass ratio of [(B)/(A)] to [(D)/(C)], with the [(B)/(A)] being the mass ratio of the content of the (B) 1,3-dipalmitin diacylglycerol to the content of the (A) 1,2-dipalmitin diacylglycerol in the diacylglycerol and the [(D)/(C)] being the mass ratio of the content of the (D) 1,3-diacylglycerol to the content of the (C) 1,2-diacylglycerol in the diacylglycerol, is preferably 0.9 or less, more preferably 0.85 or less, even more preferably 0.8 or less, even more preferably 0.75 or less, from the standpoint of further improving the physiological effects and high solubility. The mass ratio [[(B)/(A)]/[(D)/(C)]] is more preferably 0.1 or more, even more preferably 0.2 or more, even more preferably 0.23 or more, even more preferably 0.25 or more, even more preferably 0.28 or more, even more preferably 0.3 or more, even more preferably 0.35 or more, even more preferably 0.4 or more, from the standpoint of the industrial productivity of an oil or fat. The mass ratio [[(B)/(A)]/[(D)/(C)]] is more preferably from 0.1 to 0.85, even more preferably from 0.2 to 0.85, even more preferably from 0.2 to 0.8, even more preferably from 0.2 to 0.75, even more preferably from 0.3 to 0.75, from both of the standpoints of improving the physiological effects and high solubility, and the industrial productivity.

Further, in the oil or fat composition of the present invention, the mass ratio of the content of (F) 1,3-monopalmitin monoolein diacylglycerol to the content of (E) 1,2-monopalmitin monoolein diacylglycerol, [(F)/(E)], in the diacylglycerol is preferably 1.4 or more, more preferably 1.5 or more, even more preferably 1.6 or more, even more preferably 1.7 or more, from the standpoint of further improving the physiological effects and high solubility. Note that the upper limit of the [(F)/(E)] is preferably 3.0, more preferably 2.5, from the standpoint of the industrial productivity.

The oil or fat composition of the present invention can be produced by, for example, but not limited to, cooling a diacylglycerol-rich oil or fat or an oil or fat prepared by blending, if necessary, a usual edible oil or fat with a diacylglycerol-rich oil or fat so that the content of diacylglycerol reaches 20% or more and constituent fatty acids of the diacylglycerol include oleic acid in amount of 30% or more, for example, to 5 to 18° C., preferably to 18° C., leaving the oil or fat to stand still, thereby precipitating fine crystals, and then fractionating its liquid portion by centrifugal separation, filtration, or the like.

An oil or fat containing diacylglycerol may originate from any of a vegetable oil or fat and an animal oil or fat. Specific raw materials thereof may include rapeseed oil (canola oil), sunflower oil, corn oil, soybean oil, linseed oil, rice oil, safflower oil, cottonseed oil, palm oil, coconut oil, olive oil, grapeseed oil, avocado oil, sesame oil, peanut oil, macadamia nut oil, hazelnut oil, walnut oil, lard, beef tallow, chicken oil, butter oil, fish oil, and the like. Each of these oils can be used alone or some of them can be suitably mixed to be used as a raw material. It is preferred to use one or two or more kinds selected from rapeseed oil, sunflower oil, and soybean oil as a raw material from the standpoints of the content of oleic acid and the content of an unsaturated fatty acid in constituent fatty acids of the oil or fat. Further, it is also possible to use, as a raw material, an oil or fat prepared by fractionating and mixing these oils or fats, or an oil or fat prepared by adjusting the fatty acid composition thereof through hydrogenation, a transesterification reaction, or the like. An unhydrogenated oil or fat is preferred from the standpoint of reducing the content of a trans-unsaturated fatty acid in all the constituent fatty acids of the oil or fat.

The oil or fat containing diacylglycerol can be obtained through an esterification reaction between fatty acids derived from the above-mentioned oils or fats and glycerin, a transesterification reaction (glycerolysis) between an oil or fat and glycerin, or the like. These reactions can be carried out through a chemical reaction using an alkali catalyst or the like, and preferably carried out under an enzymatically mild condition by using a 1,3-selective lipase or the like, from the standpoint taste and flavor or the like.

The oil or fat composition in the present invention further contains triacylglycerol in an amount of preferably from 1 to 80%, even more preferably from 5 to 78%, even more preferably from 10 to 75%, even more preferably from 10 to 50%, from the standpoints of the physiological effects, the industrial productivity, and the appearance.

Further, the content of monoacylglycerol in the oil or fat composition is preferably 5% or less, more preferably from 0.01 to 3%, even more preferably from 0.01 to 2%, even more preferably from 0.01 to 1.5%, and the content of a free fatty acid or a salt thereof is preferably 3.5% or less, more preferably from 0.01 to 1.5%, from the standpoint of the taste and flavor. The constituent fatty acids of the triacylglycerol and the monoacylglycerol are preferably the same constituent fatty acids as those of the diacylglycerol from the standpoints of the physiological effects and of the industrial productivity of an oil or fat.

The oil or fat composition of the present invention preferably contains an antioxidant. The content of the antioxidant in the oil or fat composition is preferably 0.001 to 0.5%, more preferably 0.01 to 0.25%, and even more preferably 0.02 to 0.2%, from the standpoints of the taste and flavor, the oxidation stability, suppression of coloration and the like. Any antioxidant which is usually used in a food may be used as the antioxidant. For example, one or two or more kinds of antioxidants selected from vitamin E, butylhydroxytoluene (BHT), butylhydroxyanisole (BHA), t-butylhydroxyquinone (TBHQ), vitamin C and derivatives thereof, phospholipids, and natural antioxidants such as a rosemary extract can be used.

The oil or fat composition of the present invention preferably contains a plant sterol. The content of the plant sterol in the oil or fat composition is preferably 0.05 to 5%, and more preferably 0.3 to 4.7%, from the standpoints of cholesterol-lowering effect and the appearance of. Here, examples of the plant sterol include one or two or more kinds selected from free forms of α-sitosterol, β-sitosterol, stigmasterol, campesterol, α-sitostanol, β-sitostanol, stigmastanol, campestanol, cycloartenol, and the like, and ester forms such as fatty acid esters thereof.

The oil or fat composition of the present invention can be applied to various foods and beverages as an edible oil or fat, and among them it is useful as a liquid oil or fat because its appearance is good at normal temperature. Note that the phrase "liquid oil or fat" refers to an oil or fat which is liquid at 20° C. when it is subjected to a cooling test according to the JOCS Standard Methods for the Analysis of Fats, Oils and Related Materials 2.3.8-27.

Examples of the foods and beverages include a health food, a functional food and a food for specified health use for aiming at promotion of good health by exerting an anti-obesity function, in addition to usual foods and beverages.

The present invention and preferred embodiments of the present invention are described below.

<1> An oil or fat composition, satisfying the following items (1) to (4):
(1) the oil or fat composition includes diacylglycerol in an amount of 20 mass % or more;
(2) constituent fatty acids of the diacylglycerol include oleic acid in an amount of 30 mass % or more;
(3) the mass ratio of the content of (B) 1,3-dipalmitin diacylglycerol to the content of (A) 1,2-dipalmitin diacylglycerol, [(B)/(A)], in the diacylglycerol is 1.45 or less; and
(4) the mass ratio of the content of (D) 1,3-diacylglycerol to the content of (C) 1,2-diacylglycerol, [(D)/(C)], in the diacylglycerol is 1.2 or more.

<2> An oil or fat composition, satisfying the following items (1) to (5):
(1) the oil or fat composition includes diacylglycerol in an amount of 20 mass % or more;
(2) constituent fatty acids of the diacylglycerol include oleic acid in an amount of 30 mass % or more;
(3) the mass ratio of the content of (B) 1,3-dipalmitin diacylglycerol to the content of (A) 1,2-dipalmitin diacylglycerol, [(B)/(A)], in the diacylglycerol is 1.45 or less;
(4) the mass ratio of the content of (D) 1,3-diacylglycerol to the content of (C) 1,2-diacylglycerol, [(D)/(C)], in the diacylglycerol is 1.2 or more; and
(5) the mass ratio of the [(B)/(A)] to the [(D)/(C)], [[(B)/(A)]/[(D)/(C)]], is 0.9 or less.

<3> The oil or fat composition according to the above-mentioned item <1> or <2>, which contains diacylglycerol in an amount of 25 mass % or more, preferably 30 mass % or more, more preferably 40 mass % or more, even more preferably 50 mass or more, even more preferably 80 mass % or more.

<4> The oil or fat composition according to any one of the above-mentioned items <1> to <3>, which contains diacylglycerol in an amount of 98 mass % or less, preferably 95 mass % or less, more preferably 93 mass or less, even more preferably 92 mass % or less.

<5> The oil or fat composition according to the above-mentioned item <1> or <2>, which contains diacylglycerol in an amount of from 25 to 98 mass %, preferably from 30 to 95 mass % or more, more preferably from 50 to 93 mass % or more, even more preferably 80 to 92 mass % or more.

<6> The oil or fat composition according to any one of the above-mentioned items <1> to <5>, in which the constituent fatty acids of the diacylglycerol include oleic acid in an amount of 35 mass % or more, preferably 40 mass or more, more preferably 45 mass % or more, even more preferably 50 mass % or more.

<7> The oil or fat composition according to any one of the above-mentioned items <1> to <6>, in which the constituent fatty acids of the diacylglycerol include oleic acid in an amount of 95 mass % or less, preferably 93 mass % or less, more preferably 90 mass % or less.

<8> The oil or fat composition according to any one of the above-mentioned items <1> to <5>, in which the constituent fatty acids of the diacylglycerol include oleic acid in an amount of from 30 to 95 mass %, preferably from 35 to 95 mass %, more preferably from 40 to 93 mass %, even more preferably from 45 to 90 mass %, even more preferably from 50 to 90 mass %.

<9> The oil or fat composition according to any one of the above-mentioned items <1> to <8>, in which the constituent fatty acids of the diacylglycerol include an unsaturated fatty acid in an amount of from 80 to 100 mass %, preferably from 85 to 99 mass %, more preferably from 90 to 98 mass %.

<10> The oil or fat composition according to any one of the above-mentioned items <1> to <9>, in which the constituent fatty acids of the diacylglycerol include a saturated fatty acid in an amount of 40 mass % or less, preferably 30 mass % or less, more preferably 25 mass or less, even more preferably 20 mass or less.

<11> The oil or fat composition according to any one of the above-mentioned items <1> to <10>, in which the constituent fatty acids of the diacylglycerol include a saturated fatty acid in an amount of 2 mass % or more, preferably 3 mass % or more, more preferably 4 mass % or more, more preferably 5 mass % or more, more preferably 5.5 mass % or more.

<12> The oil or fat composition according to any one of the above-mentioned items <1> to <11>, in which the constituent fatty acids of diacylglycerol include a saturated fatty acid in an amount of from 0 to 30 mass %, preferably from 0 to 25 mass %, more preferably from 2 to 20 mass %, even more preferably from 3 to 20 mass %, even more preferably 5 to 20 mass %, even more preferably 5.5 to 20 mass %.

<13> The oil or fat composition according to any one of the above-mentioned items <1> to <12>, in which the constituent fatty acids of the diacylglycerol include a trans-unsaturated fatty acid in an amount of from 0.01 to 5 mass %, preferably from 0.01 to 3.5 mass %, more preferably from 0.01 to 3 mass %.

<14> The oil or fat composition according to any one of the above-mentioned items <1> to <13>, in which the mass ratio of the content of (B) 1,3-dipalmitin diacylglycerol to the content of (A) 1,2-dipalmitin diacylglycerol, [(B)/(A)], in the diacylglycerol is 1.4 or less, preferably 1.35 or less, more preferably 1.3 or less, even more preferably 1.2 or less, even more preferably 1.15 or less, even more preferably 1.1 or less, even more preferably 1.0 or less.

<15> The oil or fat composition according to any one of the above-mentioned items <1> to <14>, in which the mass ratio of the content of (B) 1,3-dipalmitin diacylglycerol to the content of (A) 1,2-dipalmitin diacylglycerol, [(B)/(A)], in the diacylglycerol is 0.2 or more, preferably 0.4 or more, more preferably 0.5 or more. <16> The oil or fat composition according to any one of the above-mentioned items <1> to <15>, in which the mass ratio of the content of (D) 1,3-diacylglycerol to the content of (C) 1,2-diacylglycerol, [(D)/(C)], in the diacylglycerol is 1.3 or more, preferably 1.4 or more, more preferably 1.5 or more, even more preferably 1.6 or more, even more preferably 1.7 or more, even more preferably 1.8 or more.

<17> The oil or fat composition according to any one of the above-mentioned items <1> to <16>, in which the mass ratio of the content of (D) 1,3-diacylglycerol to the content of (C) 1,2-diacylglycerol, [(D)/(C)], in the diacylglycerol is 3.0 or less, preferably 2.5 or less.

<18> The oil or fat composition according to any one of the above-mentioned items <2> to <17>, in which the [[(B)/(A)]/[(D)/(C)]] is 0.85 or less, preferably 0.8 or less, more preferably 0.75 or less.

<19> The oil or fat composition according to any one of the above-mentioned items <2> to <18>, in which the [[(B)/(A)]/[(D)/(C)]] is 0.1 or more, preferably 0.2 or more, more preferably 0.23 or more, even more preferably 0.25 or more, even more preferably 0.28 or more, even more preferably 0.3 or more, even more preferably 0.35 or more, even more preferably 0.4 or more.

<20> The oil or fat composition according to any one of the above-mentioned items <2> to <17>, in which the [[(B)/(A)]/[(D)/(C)]] is from 0.1 to 0.85, preferably from 0.2 to 0.85, more preferably from 0.2 to 0.8, even more preferably from 0.2 to 0.75, even more preferably from 0.3 to 0.75.

<21> The oil or fat composition according to any one of the above-mentioned items <1> to <20>, in which the mass ratio of the content of (F) 1,3-monopalmitin monoolein diacylglycerol to the content of (E) 1,2-monopalmitin monoolein diacylglycerol, [(F)/(E)], in the diacylglycerol is 1.4 or more, preferably 1.5 or more, more preferably 1.6 or more, even more preferably 1.7 or more.

<22> The oil or fat composition according to any one of the above-mentioned items <1> to <21>, in which the mass ratio of the content of (F) 1,3-monopalmitin monoolein diacylglycerol to the content of (E) 1,2-monopalmitin monoolein diacylglycerol [(F)/(E)], in the diacylglycerol is 3.0 or less, preferably 2.5 or less.

<23> The oil or fat composition according to any one of the above-mentioned items <1> to <22>, which further contains triacylglycerol in an amount of from 1 to 80 mass %, preferably from 5 to 75 mass %, more preferably from 10 to 75 mass %, even more preferably from 10 to 50 mass %.

<24> The oil or fat composition according to any one of the above-mentioned items <1> to <23>, which contains monoacylglycerol in an amount of 5 mass % or less, preferably from 0.01 to 3 mass %, more preferably from 0.01 to 2 mass %, even more preferably from 0.01 to 1.5 mass %.

<25> The oil or fat composition according to any one of the above-mentioned items <1> to <24>, which contains a free fatty acid or salts thereof in a amount of 3.5 mass % or less, preferably from 0.01 to 1.5 mass %.

<26> The oil or fat composition according to any one of the above-mentioned items <1> to <25>, which contains an antioxidant in an amount of from 0.001 to 0.5 mass %, preferably from 0.01 to 0.25 masse, more preferably from 0.02 to 0.2 mass %

<27> The oil or fat composition according to the above-mentioned item <26>, in which the antioxidant includes one or two or more kinds selected from vitamin E, butylhydroxytoluene, butylhydroxyanisole, t-butylhydroquinone, vitamin C and derivatives thereof, phospholipids, and natural antioxidants such as a rosemary extract.

<28> The oil or fat composition according to any one of the above-mentioned items <1> to <27>, which contains a plant sterol in an amount of 0.05 to 5 mass %, preferably 0.3 to 4.7 mass %.

<29> The oil or fat composition according to the above-mentioned item <28>, in which the plant sterol includes one or two or more kinds selected from free forms of α-sitosterol, β-sitosterol, stigmasterol, campesterol, α-sitostanol, β-sitostanol, stigmastanol, campestanol, cycloartenol, and the like and ester forms such as fatty acid esters thereof.

EXAMPLES

Analysis Method (i) Fatty Acid Composition of Oil or Fat

In accordance with "Preparation of methyl esters of fatty acids (2.4.1.-1996)" in "The JOCS Standard Methods for the Analysis of Fats, Oils and Related Materials" edited by Japan Oil Chemists' Society, methyl esters of fatty acids were prepared. The resultant samples were measured by American Oil Chemists' Society Official Method Ce 1f-96 (GLC method).

(ii) Glyceride Composition of Oil or Fat

About 10 mg of an oil or fat sample and 0.5 mL of a trimethylsilylating agent ("Silylating Agent TH" manufactured by Kanto Chemical Co., Inc.) were loaded into a glass sample bottle, followed by hermetical sealing, and the glass sample bottle was heated at 70° C. for 15 minutes. 1.0 mL of water and 1.5 mL of hexane were added to the mixture, followed by shaking. The resultant was left to stand still, and after that its upper layer was subjected to gas-liquid chromatography (GLC) to perform analysis.

<GLC Conditions>

(Conditions)

Apparatus: Agilent 6890 Series (manufactured by Agilent Technologies, Inc.)

Integrator: ChemStation B 02.01 SR2 (manufactured by Agilent Technologies, Inc.)

Column: DB-1ht (manufactured by Agilent Technologies, Inc.)

Carrier gas: 1.0 mL He/min

Injector: Split (1:50), T=320° C.

Detector: FID, T=350° C.

Oven temperature: Increased from 80° C. to 340° C. at 10° C./min and kept for 15 minutes.

(iii) Measurement of Mass Ratio of Content of (B) 1,3-Dipalmitin Diacylglycerol (1,3-PP) to Content of (A) 1,2-Dipalmitin Diacylglycerol (1,2-PP), [(B)/(A)], Mass Ratio of Content of (D) 1,3-Diacylglycerol (1,3-DAG) to Content of (C) 1,2-Diacylglycerol (1,2-DAG), [(D)/(C)], and Mass Ratio of Content of (F) 1,3-Monopalmitin Monoolein Diacylglycerol (1,3-PO) to Content of (E) 1,2-Monopalmitin Monoolein Diacylglycerol (1,2-PO) [(F)/(E)]

Pretreatment was performed in the same manner as in the "(ii) Glyceride composition of oil or fat" section, and analysis was subsequently performed by GLC.

The ratio (B)/(A), the ratio (D)/(C), and the ratio (F)/(E) were determined based on the ratios of areas in the resultant chart.

<GLC Conditions>

(Conditions)

Apparatus: Agilent 6890 Series (manufactured by Agilent Technologies, Inc.)

Integrator: ChemStation B 02.01 SR2 (manufactured by Agilent Technologies, Inc.)

Column: CP-TAP CP for Triglycerides (manufactured by Varian Medical Systems, Inc.)

Carrier gas: 1.0 mL He/min

Injector: Split (1:50), T=345° C.

Detector: FID, T=355° C.

Oven temperature: Kept at 220° C. for 12 minutes, increased to 305° C. at 1° C./min, kept for 15 minutes, increased to 354° C. at 10° C./min, and kept for 30 minutes.

Examples 1 to 4 and Comparative Examples 1 and 2

Oils or Fats G0 to G5 were Produced as Follows

Rapeseed oil was hydrolyzed, yielding fatty acids. 564 g of the fatty acids and 92 g of glycerin were mixed, and the mixture was subjected to an esterification reaction by using an immobilized 1,3-selective lipase (manufactured by Novo Nordisk Pharmaceutical Industries, Inc.) as a catalyst. After the lipase preparation was removed by filtration, the reaction product was subjected to molecular distillation, followed by decoloration, water washing, and deodorization at 235° C. for 1 hour, thereby yielding the oil or fat G0 (Comparative Example 1).

0.2 mass % of Polyol fatty acid esters (THL15 manufactured by Sakamoto Yakuhin Kogyo Co., Ltd.) were added to a part of the oil or fat G0 and the mixture was heated to 50° C., yielding a homogeneous liquid. The liquid was left to stand still in a thermostatic bath at 5° C. for 24 hours, and the liquid portion was collected by a suction filtration method, yielding the oil or fat G1 (Comparative Example 2).

Parts of the oil or fat G0 were left to stand still for 24 hours in thermostatic baths at 10° C., 12° C., 14° C., and 18° C., respectively. Each precipitated crystal was separated by centrifugation at a rotation frequency of 15,000 r/min for 20 minutes by using a centrifuge cooled to the same temperature as each of the thermostatic baths. The resultant liquid portions were collected and referred to as the oils or fats G2 to G5 (Examples 1 to 4), respectively.

Example 5 and Comparative Examples 3 to 5

Oils or Fats H0 to H3 were Produced as Follows

Sunflower oil rich in oleic acid was hydrolyzed, yielding fatty acids. The fatty acids were used in the same method as that for the oil or fat G0, thus producing the oil or fat H0 (Comparative Example 3).

0.2 mass % of Polyol fatty acid esters (THL15 manufactured by Sakamoto Yakuhin Kogyo Co., Ltd.) were added to a part of the oil or fat H0 and the mixture was heated to 50° C., yielding a homogeneous liquid. Immediately after the liquid was left to stand still in a thermostatic bath at 5° C., the liquid was wholly crystallized, and hence it was not possible to separate the intended oil or fat (H1) (Comparative Example 4).

Parts of the oil or fat H0 were left to stand still for 4 hours in thermostatic baths at 12° C. and 15° C., respectively. Each precipitated crystal was separated by centrifugation at a rotation frequency of 15,000 r/min for 20 minutes by using a centrifuge cooled to the same temperature as each of the thermostatic baths. The resultant liquid portions were collected and referred to as the oils or fats H2 and H3 (Comparative Example 5 and Example 5), respectively.

Example 6 and Comparative Example 6

Oils or Fats I0 and I1 were Produced as Follows

Rapeseed oil was hydrolyzed, yielding fatty acids. The fatty acids were used in the same method as that for the oil or fat G0, thus producing a DAG-rich oil or fat. An oil or fat produced by adding 30 g of rapeseed oil to 70 g of this oil or fat was referred to as the oil or fat I0 (Comparative Example 6).

A part of the oil or fat I0 was left to stand still for 24 hours in a thermostatic bath at 8° C. The precipitated crystal was separated by centrifugation at a rotation frequency of 15,000 r/min for 20 minutes by using a centrifuge cooled to the same temperature as each of the thermostatic bath. The resultant liquid portion was collected and referred to as the oil or fat I1 (Example 6).

Example 7 and Comparative Example 7

Oils or Fats J0 and J1 were Produced as Follows

Rapeseed oil was hydrolyzed, yielding fatty acids. The fatty acids were used in the same method as that for the oil or fat G0, thus producing a DAG-rich oil or fat. An oil or fat produced by adding 50 g of rapeseed oil to 50 g of this oil or fat was referred to as the oil or fat J0 (Comparative Example 7).

A part of the oil or fat J0 was left to stand still for 48 hours in a thermostatic bath at 8° C. The precipitated crystal was separated by centrifugation at a rotation frequency of 15,000 r/min for 20 minutes by using a centrifuge cooled to the same temperature as each of the thermostatic bath. The resultant liquid portion was collected and referred to as the oil or fat J1 (Example 7).

Example 8 and Comparative Example 8

Oils or Fats K0 and K1 were Produced as Follows

Fatty acids obtained by hydrolyzing rapeseed oil and fatty acids obtained by hydrolyzing sunflower oil were mixed at a mass ratio of 30:70, yielding fatty acids. The fatty acids were used in the same method as that for the oil or fat G0, thus producing the DAG-rich oil or fat K0 (Comparative Example 8).

A part of the oil or fat K0 was left to stand still for 24 hours in a thermostatic bath at 10° C. The precipitated crystal was separated by centrifugation at a rotation frequency of 15,000 r/min for 20 minutes by using a centrifuge cooled to the same temperature as each of the thermostatic bath. The resultant liquid portion was collected and referred to as the oil or fat K1 (Example 8).

Table 1 shows the analysis results of the fatty acid composition, glyceride composition, the (B)/(A), (D)/(C), (F)/(E), and [[(B)/(A)]/[(D)/(C)]] of each of the oils or fats G0 to G5, the oils or fats H0 to H3, the oils or fats I0 and I1, the oils or fats J0 and J1, and the oils or fats K0 and K1. Note that each fatty acid composition in the table refers to the composition in each oil or fat. Further, the fatty acid composition in each DAG was the same as that in each oil or fat. Further, each value of 1,2-PP, 1,3-PP, 1,2-DAG, 1,3-DAG, 1,2-PO, and 1,3-PO in the table refers to the concentration (chart area ratio, %) in each DAG.

TABLE 1

|  | Oil or fat | Glyceride composition (%) | | | | Fatty acid composition (%) | | | | | | | Dipalmitin (PP) | | |
|---|---|---|---|---|---|---|---|---|---|---|---|---|---|---|---|
|  |  | FFA | MAG | DAG | TAG | C16:0 | C18:0 | C18:1 | C18:2 | C18:3 | C20:0 | Others | 1,2-PP (A) | 1,3-PP (B) | (B)/(A) |
| Comparative Example 1 | G0 | 0.1 | 1.2 | 84.1 | 14.6 | 4.1 | 1.9 | 60.3 | 19.8 | 11.6 | 0.7 | 1.7 | 0.063 | 0.114 | 1.81 |
| Comparative Example 2 | G1 | 0.1 | 1.3 | 83.6 | 15.0 | 4.0 | 1.9 | 58.2 | 20.7 | 12.0 | 0.6 | 2.5 | 0.068 | 0.103 | 1.51 |
| Example 1 | G2 | 0.1 | 1.3 | 83.8 | 14.9 | 3.8 | 1.5 | 60.0 | 20.2 | 11.8 | 0.6 | 2.2 | 0.061 | 0.042 | 0.69 |
| Example 2 | G3 | 0.1 | 1.3 | 83.8 | 14.9 | 3.9 | 1.6 | 59.9 | 19.9 | 11.5 | 0.6 | 2.5 | 0.064 | 0.062 | 0.97 |
| Example 3 | G4 | 0.1 | 1.3 | 83.9 | 14.7 | 3.9 | 1.7 | 60.1 | 20.0 | 11.4 | 0.6 | 2.3 | 0.061 | 0.072 | 1.19 |
| Example 4 | G5 | 0.1 | 1.2 | 84.1 | 14.6 | 3.9 | 1.8 | 59.8 | 19.9 | 11.6 | 0.6 | 2.4 | 0.062 | 0.088 | 1.43 |
| Comparative Example 3 | H0 | 0.2 | 2.5 | 92.2 | 5.2 | 2.8 | 3.3 | 87.7 | 4.6 | 0.4 | 0.3 | 1.0 | 0.031 | 0.061 | 1.97 |
| Comparative Example 4 | H1 |  |  |  |  |  |  | Inseparable |  |  |  |  |  |  |  |
| Comparative Example 5 | H2 | 0.2 | 2.7 | 92.3 | 4.9 | 2.7 | 3.2 | 87.8 | 4.7 | 0.4 | 0.3 | 0.9 | 0.031 | 0.052 | 1.68 |
| Example 5 | H3 | 0.2 | 2.6 | 92.5 | 4.8 | 2.7 | 3.1 | 88.0 | 4.6 | 0.4 | 0.3 | 0.9 | 0.033 | 0.039 | 1.18 |
| Comparative Example 6 | I0 | 0.1 | 0.8 | 58.5 | 40.5 | 4.1 | 1.9 | 61.1 | 19.4 | 10.3 | 0.7 | 2.4 | 0.047 | 0.093 | 1.98 |
| Example 6 | I1 | 0.1 | 0.8 | 58.4 | 40.7 | 4.0 | 1.9 | 61.6 | 19.2 | 10.1 | 0.7 | 2.5 | 0.046 | 0.047 | 1.02 |
| Comparative Example 7 | J0 | 0.1 | 0.5 | 41.7 | 57.8 | 4.1 | 1.8 | 61.4 | 19.7 | 10.2 | 0.7 | 2.1 | 0.033 | 0.070 | 2.12 |
| Example 7 | J1 | 0.1 | 0.5 | 40.1 | 59.4 | 4.0 | 1.8 | 61.6 | 19.7 | 10.2 | 0.6 | 2.1 | 0.032 | 0.033 | 1.03 |
| Comparative Example 8 | K0 | 0.1 | 0.6 | 86.0 | 13.2 | 5.6 | 2.6 | 44.2 | 43.3 | 2.3 | 0.4 | 1.6 | 0.099 | 0.221 | 2.23 |
| Example 8 | K1 | 0.1 | 0.6 | 85.6 | 13.6 | 5.4 | 2.5 | 43.4 | 44.5 | 2.4 | 0.3 | 1.5 | 0.103 | 0.077 | 0.75 |

|  | Oil or fat | Whole DAG | | | Palmitin + olein (PO) | | | [(B)/(A)]/[(D)/(C)] |
|---|---|---|---|---|---|---|---|---|
|  |  | 1,2-DAG (C) | 1,3-DAG (D) | (D)/(C) | 1,2-PO (E) | 1,3-PO (F) | (F)/(E) |  |
| Comparative Example 1 | G0 | 34.377 | 65.623 | 1.91 | 1.760 | 3.618 | 2.06 | 0.95 |
| Comparative Example 2 | G1 | 35.411 | 64.589 | 1.82 | 1.812 | 3.488 | 1.92 | 0.83 |
| Example 1 | G2 | 35.411 | 64.589 | 1.82 | 1.788 | 3.139 | 1.76 | 0.38 |
| Example 2 | G3 | 34.545 | 65.455 | 1.89 | 1.777 | 3.504 | 1.97 | 0.51 |
| Example 3 | G4 | 34.674 | 65.326 | 1.88 | 1.716 | 3.536 | 2.06 | 0.63 |
| Example 4 | G5 | 34.386 | 65.614 | 1.91 | 1.768 | 3.798 | 2.15 | 0.75 |
| Comparative Example 3 | H0 | 31.412 | 68.588 | 2.18 | 1.643 | 3.456 | 2.10 | 0.90 |
| Comparative Example 4 | H1 |  |  |  | Inseparable |  |  |  |
| Comparative Example 5 | H2 | 31.412 | 68.588 | 2.18 | 1.584 | 3.507 | 2.21 | 0.77 |
| Example 5 | H3 | 31.545 | 68.455 | 2.17 | 1.594 | 3.286 | 2.06 | 0.54 |
| Comparative Example 6 | I0 | 34.304 | 65.696 | 1.91 | 1.232 | 2.994 | 2.43 | 1.03 |
| Example 6 | I1 | 34.321 | 65.679 | 1.90 | 1.209 | 2.858 | 2.36 | 0.54 |

TABLE 1-continued

| | | | | | | | |
|---|---|---|---|---|---|---|---|
| Comparative Example 7 | J0 | 34.197 | 65.803 | 1.92 | 0.885 | 1.778 | 2.01 | 1.10 |
| Example 7 | J1 | 34.278 | 65.722 | 1.92 | 0.844 | 1.761 | 2.09 | 0.54 |
| Comparative Example 8 | K0 | 30.558 | 69.442 | 2.27 | 1.435 | 3.429 | 2.39 | 0.98 |
| Example 8 | K1 | 30.818 | 69.182 | 2.24 | 1.442 | 3.243 | 2.25 | 0.33 |

FFA: Free fatty acid
MAG: Monoacylglycerol
DAG: Diacylglycerol
TAG: Triacylglycerol Test Example 1

30 g each of the oils or fats G0 to G5, the oils or fats H0 to H3, the oils or fats I0 and I1, the oils or fats J0 and J1, and the oils or fats K0 and K1 were dispensed in glass vials (SV-50 manufactured by Nichiden-Rika Glass Co., Ltd.). The glass vials were closed with a lid and left to stand still for 72 hours in a thermostatic bath at 5° C. for the crystallization of the oils or fats. The glass vials were transferred into thermostatic baths at 22° C., 20° C., 18° C., or 16° C. 5 hours later, the presence or absence of crystals was checked visually on the basis of the criteria shown below. The results are shown in Tables 2 to 6.
(Evaluation Criteria of Presence or Absence of Crystals)
3: Clear
2: Very slightly turbid
1: Undissolved crystals are noticeable.

TABLE 2

| Oil or fat | | Comparative Example 1 G0 | Comparative Example 2 G1 | Example 1 G2 | Example 2 G3 | Example 3 G4 | Example 4 G5 |
|---|---|---|---|---|---|---|---|
| Crystal evaluation | 22° C. | 2 | 2 | 3 | 3 | 3 | 3 |
| | 20° C. | 1 | 2 | 3 | 3 | 3 | 2 |
| | 18° C. | 1 | 1 | 3 | 3 | 3 | 1 |
| | 16° C. | 1 | 1 | 3 | 3 | 2 | 1 |

TABLE 3

| Oil or fat | | Comparative Example 3 H0 | Comparative Example 4 H1 | Comparative Example 5 H2 | Example 5 H3 |
|---|---|---|---|---|---|
| Crystal evaluation | 22° C. | 1 | — | 2 | 3 |
| | 20° C. | 1 | — | 1 | 3 |

TABLE 4

| Oil or fat | | Comparative Example 6 I0 | Example 6 I1 |
|---|---|---|---|
| Crystal evaluation | 22° C. | 2 | 3 |
| | 20° C. | 1 | 3 |

TABLE 5

| Oil or fat | | Comparative Example 7 J0 | Example 7 J1 |
|---|---|---|---|
| Crystal evaluation | 20° C. | 2 | 3 |
| | 18° C. | 2 | 3 |

TABLE 6

| Oil or fat | | Comparative Example 8 K0 | Example 8 K1 |
|---|---|---|---|
| Crystal evaluation | 20° C. | 1 | 3 |
| | 18° C. | 1 | 3 |

The results shown in Tables 2 to 6 demonstrated that each oil or fat composition of the present invention was clear at normal temperature (22° C.), and that, even when crystals were precipitated under low temperature, the solubility of the crystals was high at normal temperature. On the other hand, in each comparative example, precipitated crystals are not dissolved at normal temperature (22° C.) and undissolved crystals were noticeable.

The invention claimed is:

1. An oil or fat composition, satisfying the following items (1) to (4):
    (1) the oil or fat composition comprises diacylglycerol in an amount of 20 mass % or more;
    (2) constituent fatty acids of the diacylglycerol comprise oleic acid in an amount of 30 mass % or more;
    (3) a mass ratio of a content of (B) 1,3-dipalmitin diacylglycerol to a content of (A) 1,2-dipalmitin diacylglycerol, [(B)/(A)], in the diacylglycerol is 1.45 or less; and
    (4) a mass ratio of a content of (D) 1,3-diacylglycerol to a content of (C) 1,2-diacylglycerol, [(D)/(C)], in the diacylglycerol is 1.2 or more.

2. The oil or fat composition according to claim 1, wherein the [(B)/(A)] is 1.35 or less and the [(D)/(C)] is 1.6 or more.

3. The oil or fat composition according to claim 1, wherein the [(B)/(A)] is from 0.2 to 1.35.

4. The oil or fat composition according to claim 3, wherein the [(D)/(C)] is from 1.6 to 2.5.

5. The oil or fat composition according to claim 1, wherein the [(B)/(A)] is from 0.4 to 1.2.

6. The oil or fat composition according to claim 5, wherein the [(D)/(C)] is from 1.7 to 2.5.

7. The oil or fat composition according to claim 1, wherein the [(B)/(A)] is from 0.4 to 1.0.

8. The oil or fat composition according to claim 7, wherein the [(D)/(C)] is from 1.8 to 2.5.

9. The oil or fat composition according to claim 1, wherein the is from 0.1 to 0.85.

10. The oil or fat composition according to claim 1, wherein the is from 0.2 to 0.75.

11. The oil or fat composition according to claim 1, wherein a mass ratio of a content of (F) 1,3-monopalmitin monoolein diacylglycerol to a content of (E) 1,2-monopalmitin monoolein diacylglycerol, [(F)/(E)], in the diacylglycerol is 1.4 or more.

12. The oil or fat composition according to claim 1, wherein a mass ratio of a content of (F) 1,3-monopalmitin monoolein diacylglycerol to a content of (E) 1,2-monopalmitin monoolein diacylglycerol, [(F)/(E)], in the diacylglycerol is from 1.7 to 2.5.

13. The oil or fat composition according to claim 1, wherein the oil or fat composition comprises diacylglycerol in an amount of 50 mass % or more.

14. The oil or fat composition according to claim 1, wherein the constituent fatty acids of the diacylglycerol comprise oleic acid in an amount of from 35 to 95 mass %.

15. The oil or fat composition according to claim 1, wherein the constituent fatty acids of the diacylglycerol comprise a saturated fatty acid in an amount of 40 mass % or less.

16. The oil or fat composition according to claim 1, wherein the constituent fatty acids of the diacylglycerol comprise a saturated fatty acid in an amount of 2 mass % or more.

17. The oil or fat composition according to claim 1, wherein the oil or fat composition comprises a free fatty acid or a salt thereof in an amount of 3.5 mass % or less.

18. The oil or fat composition according to claim 1, wherein the oil or fat composition comprises a plant sterol in an amount of 0.05 to 5 mass %.

19. An oil or fat composition, satisfying the following items (1) to (5):
   (1) the oil or fat composition comprises diacylglycerol in an amount of 20 mass % or more;
   (2) constituent fatty acids of the diacylglycerol comprise oleic acid in an amount of 30 mass % or more;
   (3) a mass ratio of a content of (B) 1,3-dipalmitin diacylglycerol to a content of (A) 1,2-dipalmitin diacylglycerol, [(B)/(A)], in the diacylglycerol is 1.45 or less;
   (4) a mass ratio of a content of (D) 1,3-diacylglycerol to a content of (C) 1,2-diacylglycerol, [(D)/(C)], in the diacylglycerol is 1.2 or more; and
   (5) a mass ratio of the [(B)/(A)] to the [(D)/(C)], [(B)/(A)]/[(D)/(C)], is 0.9 or less.

20. An oil or fat composition, satisfying the following items (1) to (5):
   (1) the oil or fat composition comprises diacylglycerol in an amount of from 50 to 93 mass %;
   (2) constituent fatty acids of the diacylglycerol comprise oleic acid in an amount of from 45 to 90 mass %;
   (3) a mass ratio of a content of (B) 1,3-dipalmitin diacylglycerol to a content of (A) 1,2-dipalmitin diacylglycerol, [(B)/(A)], in the diacylglycerol is from 0.4 to 1.0;
   (4) a mass ratio of a content of (D) 1,3-diacylglycerol to a content of (C) 1,2-diacylglycerol, [(D)/(C)], in the diacylglycerol is from 1.8 to 2.5; and
   (5) a mass ratio of the [(B)/(A)] to the [(D)/(C)], [(B)/(A)]/[(D)/(C)], is 0.2 to 0.75.

* * * * *

UNITED STATES PATENT AND TRADEMARK OFFICE
CERTIFICATE OF CORRECTION

PATENT NO. : 9,017,753 B2
APPLICATION NO. : 14/116582
DATED : April 28, 2015
INVENTOR(S) : Katsuyoshi Saito et al.

It is certified that error appears in the above-identified patent and that said Letters Patent is hereby corrected as shown below:

In the Claims

Column 15, line 2, Claim 9
"the is from 0.1 to 0.85" should read --the $[[(B)/(A)]/[(D)/(C)]]$ is from 0.1 to 0.85--

Column 15, line 4, Claim 10
"the is from 0.2 to 0.75" should read --the $[[(B)/(A)]/[(D)/(C)]]$ is from 0.2 to 0.75--

Signed and Sealed this
Twenty-ninth Day of September, 2015

Michelle K. Lee
*Director of the United States Patent and Trademark Office*